United States Patent [19]

Rosenberg et al.

[11] 4,355,079

[45] Oct. 19, 1982

[54] CORROSION INHIBITION

[75] Inventors: Arnold M. Rosenberg, Potomac; James M. Gaidis, Ellicott City, both of Md.

[73] Assignee: W. R. Grace & Co., New York, N.Y.

[21] Appl. No.: 256,221

[22] Filed: Apr. 21, 1981

Related U.S. Application Data

[63] Continuation of Ser. No. 77,218, Sep. 20, 1979, abandoned, which is a continuation-in-part of Ser. No. 700,344, Jun. 28, 1976, abandoned.

[51] Int. Cl.$^3$ .................... B32B 9/00; B32B 15/04
[52] U.S. Cl. ................................. 428/469; 428/457; 427/435; 148/6.2

[58] Field of Search .................. 428/457, 469; 427/430.1, 430.2, 430.3, 435, 427; 106/89, 90, 302, 306; 148/6.2

[56] References Cited

U.S. PATENT DOCUMENTS

| | | | |
|---|---|---|---|
| 3,210,207 | 10/1965 | Dodson et al. | 106/90 |
| 3,427,175 | 2/1969 | Angstadt et al. | |
| 3,619,441 | 11/1971 | Burchett | 148/6.2 |
| 3,682,718 | 8/1972 | Palm et al. | 148/6.12 |
| 3,755,003 | 8/1973 | Palm et al. | 148/6.2 |

Primary Examiner—Shrive P. Beck
Attorney, Agent, or Firm—Howard J. Troffkin

[57] ABSTRACT

This invention is directed to coating metal elements with a thin film of calcium nitrite (including compositions containing same) whereby the metal is inhibited against corrosion on being placed in hydraulic cement.

13 Claims, No Drawings

CORROSION INHIBITION

This is a continuation, of application Ser. No. 77,218, filed Sept. 20, 1979 now abandoned which, in turn, is a continuation-in-part application of U.S. Ser. No. 700,344 filed June 28, 1976 now abandoned.

BACKGROUND OF THE INVENTION

This invention is directed to coating metal elements with a thin film of calcium nitrite (including compositions containing same) whereby the metal is inhibited against corrosion on being placed in hydraulic (including alite) cement.

The binder component in the cements, mortars and concretes used widely as a construction material is portland cement. Portland cement is manufactured by calcining a mixture of limestone and clay to form a clinker, and by grinding the clinker to a fine powder. The major compounds found in portland cement are tricalcium silicate, dicalcium silicate, tricalcium aluminate, and tetracalcium aluminoferrite. The tricalcium and dicalcium silicates are thought to be the principal bonding constituents in the portland cement. Tricalcium silicate, when mixed with water, forms a calcium silicate hydrate known as tobermorite gel and calcium hydroxide. The dicalcium silicate, when contacted with water, forms similar products but at a much lower rate of reaction. The tricalcium silicate, having the greater rate of reaction determines, to a large extent, the hardening rate of the cement. To provide materials which are suitable for different uses, portland cements having a range of hardening rates have been found desirable. By producing cements having a range of proportions of tricalcium silicate present, a range of hardening rates and strength development has been obtained. Four general types of portland cements, varying principally in the relative quantities of tricalcium silicate and dicalcium silicate present therein, are commonly produced. The proportions of the principal compounds present in each type of cement are shown in Table I.

TABLE I

| Cement type | I | II | III | IV |
|---|---|---|---|---|
| Composition, wt. percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "alite cement" is defined as including neat pastes, mortars, and concretes and the mixed, dry unreacted ingredients of neat pastes, mortars, and concretes, comprising as alite cement binder, a composition containing greater than 20 percent tricalcium silicate based on the dry weight of the composition. The most common alite cements are portland cements, and mortars and concretes containing portland cements. Most commerically available alite cements contain binders comprising from about 20 to 75 percent tricalcium silicate. The alite cement binder, or concrete binder, is the component which provides the desired bonding, for example, portland cement.

Hydraulic cements (including alite cements) encounter various corrosion environments. In some, the environment is an inherent part of the cement, e.g., as by use of calcium chloride accelerator, or the use of chloride containing materials. Other environments may be extraneous, e.g., use of calcium chloride and/or salt in snow and ice removal, exposure to salt spray or brines, and the like. Such environments tend to attack and corrode metal pieces within or in contact with the alite cement. The instant invention provides coatings for the metal that we believe inhibit such corrosion.

THE PRIOR ART

The use of sodium nitrite in cements is known. See Japanese patent, Publication No. 33-940, published Feb. 15, 1958, application Ser. No. 30-33777, filed Dec. 27, 1955, Kano et al. This patent teaches, inter alia, that sodium nitrite can be added to cement and concrete compositions during mixing to inhibit corrosion of reinforcing iron and steel bars and frames. The aggregate used was sea sand.

U.S. Pat. No. 3,427,175, Angstadt et al, discloses the use of calcium nitrite as an accelerator which inhibits corrosion in alite cement compositions. The calcium nitrite may contain minor amounts of sodium nitrite and may be used with calcium chloride and other accelerators.

U.S. Pat. No. 3,210,207, Dodson et al, teaches the use of mixes of calcium formate with minor amounts of certain nitrite or chromate salts as corrosion inhibitors, to be used as accelerators in cement compositions. The embedded metal to be protected can be steel, aluminum, or zinc. The inventors consider that the nitrite or chromate forms a protecting coating on the metal.

U.S. Pat. No. 3,801,338, Whitaker, teaches the use of a mixture of calcium formate and sodium nitrite for adding to cement compositions which are to contain metal reinforcement. Improved compressive strength is taught, together with sulfate resistance and has "a positive corrosion inhibition effect."

THE INVENTION

Calcium nitrite can be used as an effective corrosion inhibiting coating on steel structures, including iron, steel, aluminum, steel-aluminum alloy grids, reinforcing rods, girders, etc., which are in contact with corrosion environments in alite cements.

There are several ways to coat the metal piece with the inhibitor. The simplest way is to make up an aqueous solution of calcium nitrite, say for example, 10 to 40 weight percent, dip the work piece into this solution, pull it out, and let it air dry or oven dry. This will give an effective coating of the inhibitor on the metal piece. The metal piece can then be placed as a structural member in concrete, mortar, or the like. Spraying with a hose is also effective as is, wiping or brushing the inhibitor onto the metal.

There are various other systems of coating the metal piece with the inhibitor. The calcium nitrite can also be contained in a carrier material which is then applied to the metal piece. For example, in one system, the inhibitor is admixed into a slurry of hydraulic cement, in an amount of about 1 to 2 weight percent, based on the weight of solids in the cement. The metal piece is then dipped into the slurry, withdrawn, then permitted to cure, and after curing is then available for use in alite cement matrix. Numerous other systems of coating the metal piece will be evident to those skilled in the art.

It has been found that calcium nitrite can be coated as a thin film on a metal piece. The film thickness can be from about 0.005 inch (5 mils) to about 0.375 inch and, more preferably, from about 0.005 inch to 0.06 inch thick. Such thin film coatings of calcium nitrite have been unexpectedly found to effectively inhibit corrosion of the treated metal piece when it is subsequently embedded in or in contact with cement, concrete, mortar or the like. The present invention has been found more effective than other known metal salts as inhibitors.

The present invention causes effective corrosion inhibition of metal pieces without the need for using large amounts of calcium nitrite. It is well known that large scale manufacture, such as commercial manufacture, of nitrite salts is difficult and causes the subject inhibitor to be expensive. To form an effective and economically efficient reinforced cement system, one should utilize the coated metal pieces in conjunction with a nitrite-free alite cement. That is to say, the cement in which the pre-coated metal pieces are embedded in or in contact with should be free of nitrite salt such as calcium nitrite. In this manner one forms a corrosion inhibiting system in a most effective and efficient manner.

Associated Systems of Corrosion Control

The coated metal articles of this invention can be used in association with many standard systems of alite cement corrosion control, including powder epoxy coatings; polymer-impregnated concrete; waterproof membranes; dense concrete, low water-cement ratio and super-plasticizers; integral addition of wax beads; expansive cements; fly ash; latex modified motar topping; inorganic polymer addition; and polymer concrete. (Examples of suitable latices for latex modified mortar topping are acrylic, polyvinyl acetate, polyvinyl alcohol, vinylidene chloride, styrene-butadiene, and copolymers of these.)

Mixtures

It is our information and belief that any of the above mentioned systems should work quite well in concert with the coated articles of this invention. However, special mention should be made of certain of these. The first case is methods of treating concrete that would reduce the water permeability. In these cases a harsh mix with a low water/cement ratio would tend to make the calcium nitrite coating more effective. However, because of the placing difficulties with a harsh mix an admixture could be used to reduce the water and maintain the same plasticity of the mix. In these cases a plasticizer could be used such as copolymers of naphthalene formaldehyde resins or the more normally used water reducing agents such as 80% calcium lignosulfonate and 20% triethylamine added at an addition rate of 0.1 to 0.4 percent s/s cement.

Use with Water Reducing Agents

A water reducing agent is a material added to cement during the manufacture of the concrete to improve the placeability or workability of the mix which allows normal hardening of the concrete to take place, which eventually produces 28-day strengths that are at least 10% stronger than the mix not containing the admixture. Generally a reducing agent causes 5% or greater reduction of water in the mix. Water reducing agents are described in ASTM C-494.

A preferred formulation using the calcium nitrite coated articles of this invention involves a water reducing agent. There are at least two reasons for this. In the first place an ordinary mix making a water reducing agent may tend to form large random bubbles against reinforcing rods during placement of the concrete or cement. Our experimental work shows that the surface of the reinforcing rod exposed to such large random bubbles shows aggravated corrosion, as compared to surfaces of the rod not in contact with such bubbles. In the second place the use of such water reducing agents results in the formation of a more dense cement or concrete, and in consequence reduces ingress of corrosive salts from the environment.

A preferred water reducing agent is 80% calcium lignosulfonate and 20% calcium chloride added at an addition rate of 0.1 to 0.4 percent. Other water reducing agents include additives such as triethanolamine formate or polysaccharides.

Use with Retarders

As is known in the cement art, sodium gluconate, calcium lignosulfonate, saccharide type materials and the like, have a known characteristic of improving the placeability and strength as well as retarding the set of the concrete mix. Hence simply by the use of any of the standard retarders, it is our information and belief that the corrosion control properties of the calcium nitrite as used herein should be enhanced.

Use with Air Entraining Agents

Air entraining agents are added to concrete during, e.g., bridge construction, to improve durability. They work by providing small expansion chambers within the concrete mix such that when water freezes within the concrete, concrete does not spall and crack. When an air entraining agent is used it is our information and belief that the mean free path for the introduction of chloride into the concrete is kept to a maximum, reducing the chloride concentration at the surface of the coated metal articles of this invention, thereby making less inhibitor necessary.

As an air entraining agent Vinsol Resin sold commercially by Hercules Powder Co. is recommended. This material is of the family of wood rosins. Also suitable are saponified tall oil resins and sodium lauryl sulfonate (this being an anionic surfactant) and Triton X-100 (this being a nonyl phenol ethylene oxide condensate, a nonionic surfactant).

Use with Accelerators

It is our information and belief that the articles of this invention can be used with alite cement containing accelerators. The accelerator should be chosen from among those known agents which are capable of accelerating the cement set and which are economically attractive. Therefore, the use of nitrite salts in the cement is not contemplated. Useful accelerators include sodium silicate, sodium carbonate, triethanolamine, calcium chloride and the like. Other conventional accelerators well known to those skilled in the cement and concrete art are listed in standard texts on this subject.

Use with Pozzolans

It is our information and belief that these materials, whether natural or artificial (e.g., fly ash, blast furnace slag, and the like) are useful with the coated metal pieces of this invention in that these added materials fill up voids in the concrete and/or cement mix, thereby reducing the amount of inhibitor required for equivalent corrosion control.

All statements herein are made on information and belief.

We claim:

1. An article consisting essentially of a metal piece coated with a thin film of from about 0.005 to about 0.375 inch thick consisting essentially of calcium nitrite and a cement-free carrier, said composition being applied as a film on the metal piece and said metal being iron, steel, aluminum or aluminum-steel alloy.

2. The article according to claim 1 in which the calcium nitrite film coating is from about 0.005 to 0.06 inch thick.

3. The article according to claim 1 wherein the metal of said piece is an iron containing metal selected from the group consisting of iron, steel and steel-aluminum alloy.

4. The article according to claim 2 in which the composition is formed of water soluble components applied as an aqueous solution.

5. An article consisting essentially of a metal piece coated with a thin film of from about 0.005 to about 0.375 inch thick consisting essentially of calcium nitrite, said composition being applied as a film on the aluminum-steel alloy.

6. An article comprising an alite cement which is free of nitrite salt and metal pieces embedded therein, said metal pieces being precoated with a thin film of from about 0.005 to about 0.375 inch thick of a coating composition containing calcium nitrite, said composition being applied as a film on the metal and said metal being iron, steel, aluminum or aluminum-steel alloy.

7. The article according to claim 6 wherein the calcium nitrite film coating is from about 0.005 to 0.06 inch thick.

8. The article according to claim 6 wherein the metal of said metal piece contained therein is an iron containing metal selected from the group consisting of iron, steel and steel-aluminum alloy.

9. The article according to claim 6 wherein the coating composition consists essentially of calcium nitrite.

10. The article according to claim 6 wherein the coating composition is formed of water soluble components applied as an aqueous solution and having from 10 to 40 percent by weight calcium nitrite.

11. The article according to claim 6 further comprising a water reducing agent admixed with the cement.

12. The article according to claim 6 in which the water reducing agent is calcium lignosulfonate.

13. The article according to claim 6 further comprising a plasticizer and a retarder admixed with the cement.

* * * * *

UNITED STATES PATENT AND TRADEMARK OFFICE
CERTIFICATE OF CORRECTION

PATENT NO. : 4,355,079
DATED : October 19, 1982
INVENTOR(S) : Arnold Morry Rosenberg et al It is certified that error appears in the above-identified patent and that said Letters Patent are hereby corrected as shown below:

In Claim 5, line 4, after "on the" insert
-- metal piece and said metal being iron, steel, aluminum or --.

Signed and Sealed this

Twenty-eighth Day of December 1982

[SEAL]

*Attest:*

GERALD J. MOSSINGHOFF

*Attesting Officer*    *Commissioner of Patents and Trademarks*